United States Patent [19]

Piller

[11] 4,035,711
[45] July 12, 1977

[54] ROTARY FREQUENCY-CHANGER

[76] Inventor: Hans Piller, Osterode, Harz, Germany

[21] Appl. No.: 597,647

[22] Filed: July 21, 1975

[30] Foreign Application Priority Data

July 26, 1974 Germany .......................... 2435974
June 26, 1975 Germany .......................... 2528436

[51] Int. Cl.² .......................................... H02M 7/00
[52] U.S. Cl. ............................. 363/157; 312/250; 361/384; 363/141; 361/379
[58] Field of Search .................. 72/448, 446; 100/DIG. 18; 174/16 R, 52 R, 58; 310/58, 62, 63, 160; 312/250; 317/100; 321/62, 63, 64, 8 C

[56] References Cited

U.S. PATENT DOCUMENTS

| 3,234,451 | 2/1966 | Diebold | 321/8 C |
| 3,482,894 | 12/1969 | Pryor | 312/250 |
| 3,621,339 | 11/1971 | Hodgson | 317/100 X |

FOREIGN PATENT DOCUMENTS 1,128,887 10/1968 United Kingdom ............... 317/100

OTHER PUBLICATIONS

IBM Technical Disclosure Bulletin, "Air Cooling for Data-Processing Systems", J. F. DeJong, vol. 15, No. 12, May 1973.

Primary Examiner—William M. Shoop

[57] ABSTRACT

A frequency-changer comprising an air-cooled rotary frequency converter having a shaft which carries a rotor of a fan arranged to cool the converter by forced ventilation. The converter is located in a sound-proofed housing through which forced air flow produced by the fan is passed. The housing defines above the converter a chamber through which the air is guided to flow in the opposite direction to the air flow through the converter. The chamber has an upright baffle at each end and is divided into two compartments by a wall extending through the chamber parallel with the axis of rotation of the converter. Controls for the converter are accommodated in the compartments.

13 Claims, 8 Drawing Figures

ROTARY FREQUENCY-CHANGER

The invention concerns a rotary frequency-changer or converter of the type cooled by forced ventilation by means of a fan, the rotor of which is mounted on the shaft of the frequency-changer. Such a frequency-changer is usually installed in a soundproofed housing in which the air flow undergoes a multiplicity of deflections.

In computer technology use is made of alternating voltage at 400 Hz. This alternating voltage is obtained from rated 50 or 60 Hz alternating voltage by conversion in rotary frequency-changers. The sound level reached by low-power frequency-changers in the 16 KVA range with soundproofing of the kind mentioned enables these converters to be installed in the same operating room as the computer. With increasing size of the computer plant, the power supply must also be increased, requiring frequency-changers with power of the order 75 KVA. Such converters produce much more noise than the above-mentioned lower-power converters. In order to obtain a sound level of the order 90 db, such power has hitherto been produced by low-speed converters with speeds ranging from 1500 to 1800 r.p.m. These low-speed converters have a large volume and a great weight. Special precautions have therefore to be taken in their erection. This along with the noise level of the order 90 db has resulted in such converters normally being installed in cellars, which often requires electrical leads of considerable length which are another item of cost, whilst also occasioning considerable inductive losses depending on the frequency used. The purpose of the invention is to fashion a high-power rotary frequency-changer operable at 3000 to 3600 r.p.m. and of light construction for installation in the same operating room as a computer plant. Industrial standards lay down 67 db as the maximum permissible noise level for the operating room of a computer plant.

According to the invention a frequency-changer comprises a rotary frequency converter of which a shaft carries a rotor of a fan arranged to cool the converter by forced ventilation and a sound-proofed housing in which the converter is mounted and through which forced air flow produced by the fan is passed, the housing defining above the converter a chamber through which the air is guided to flow in the opposite direction to the air flow through the converter, the chamber having an upright baffle adjacent each end thereof and being divided into two compartments by a wall extending through the chamber parallel with the axis of rotation of the converter, each compartment accommodating controlling means for the converter.

Provision is made with advantage for the air baffle adjacent an end wall of the housing defining the chamber and containing an air exit to extend downward from the ceiling and for the air exit in the end wall to be in an upper part thereof.

The air inlet is expediently formed in the housing wall opposite the air outlet.

The fan is advantageously situated at the air inlet end of the converter and at the remote end thereof from the air inlet to the housing.

The walls of the housing are conveniently lined with sound-absorbing material and the air baffles are also made from, or covered by, sound-absorbing material.

With a frequency-changer designed in accordance with the invention having power of 75 KVA and an output frequency of 400 Hz, the sound radiation was measured and found to be 63 db for a speed of 3000 r.p.m. at 50 Hz supply frequency, and 67 db for 3600 r.p.m. at 60 Hz supply frequency. Thus rotary frequency-changers of the power in question can be installed in the same room as a computer plant. Owing to the considerably reduced weight by the changeover to 3000 or 3600 r.p.m. the frequency-changers can furthermore be erected anywhere on a floor of a building in accordance with required standards. No special constructional precautions are therefore required for erection.

By erection indirectly in the operating room, the installation of providing cables leading, for example, from a cellar are avoided and the available effective output of the frequency changer is correspondingly increased.

Rotary frequency-changers or converters need maintenance from time to time, and for this purpose they must be taken out of the housing. A further purpose of the invention is to design a frequency-changer, in accordance with the invention, which can be withdrawn without difficulty from the housing for maintenance purposes without requiring expensive travelling hoists, which are not normally usable in rooms where computers are installed.

According to a further feature of the invention therefore, the converter is mounted on supports each including a vibration damper normally arranged to rest on a supporting surface in the housing, each support also including a roller, having an axle parallel to the axis of rotation of the converter and so arranged that the roller is positioned above said supporting surface when the vibration damper is engaged with said supporting surface, and a lifting device having a pedestal which is arranged to be lowered to engage said supporting surface to lift the vibration damper from engagement with said supporting surface.

A pair of removable rails would be provided and be inserted one under each roller when the vibration dampers have been lifted from engagement with said supporting surface, the pedestals then being raised from said supporting surface to permit the converter to be moved on the rollers along the rails.

Conveniently each pedestal is carried by a vertically movable upright pin.

This may be a screw-threaded bolt, each lifting device comprising a nut engaging the respective bolt and engageable with an underneath surface of the respective support. Each nut may have a spherical end face engageable with a spherically-recessed washer engageable with the underneath surface of the respective support.

Alternatively each pin may be urged by a spring in a direction to lift the pedestal thereon from said supporting surface, each lifting device comprising a cam arranged to engage the respective pin to move it axially against the force of the spring to move the pedestal into engagement with said supporting surface.

In another design variant the upper end of each pin is engaged by a toggle mechanism which is extendible through its dead-centre position to raise and lower the pin respectively to disengage and engage the pedestal thereon with said supporting surface, a stop being provided to be engaged by the toggle mechanism after the toggle mechanism has been moved through the dead-centre position in the direction to lower the associated pedestal to hold the pedestal in engagement with said supporting surface.

By way of example, a frequency-changer in accordance with the invention is illustrated by representative drawings to which reference will be made in the following description. In the drawings.

Figure 1:
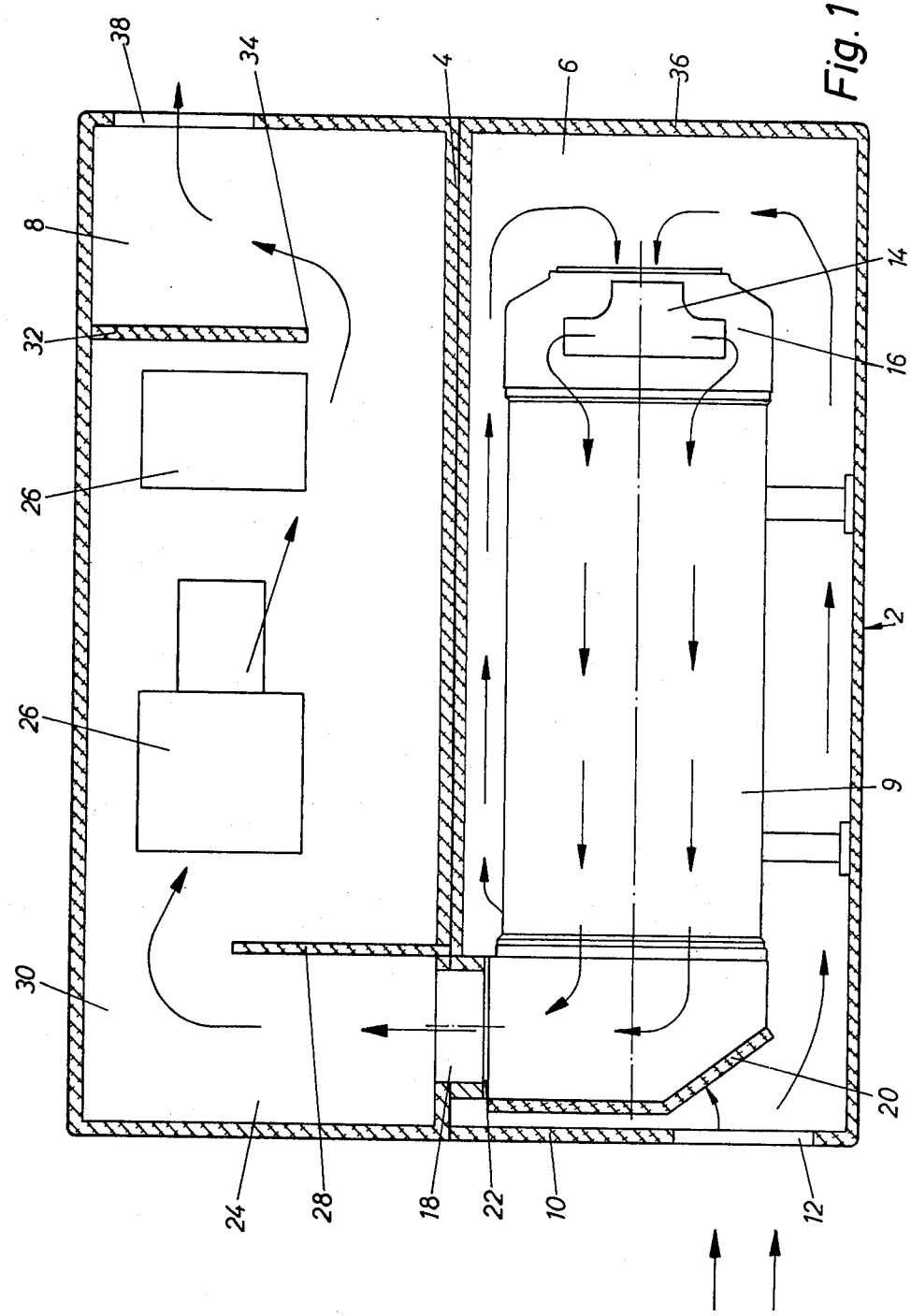
FIG. 1 is a schematic longitudinal section of the frequency-changer including the actual frequency converter positioned in a sound-absorbing housing.

Referring to FIG. 1, the frequency-changer, as a whole, comprises a sound-absorbing housing 2 divided by a horizontal separating wall 4 into a lower chamber 6 and an upper chamber 8. In the lower chamber 6 there is accommodated the vibration-damped rotary-frequency-changer itself, hereinafter called the converter 9. The converter 9 has a power output of the order 75 KVA and an output frequency of 400 Hz. The chamber 6 has an air inlet 12 at the lower end of a housing wall 10. At the end opposite the air intake 12, the converter 9 carries a fan 14, the rotor 16 of which is either mounted on the shaft of the converter, or is directly coupled to the shaft. The end of the horizontal separating wall 4 adjacent wall 10 has an air passage 18 therein. At this end the converter is provided with an air deflection plate 20, the outlet of which is sealed in the opening 18. The upper chamber 8 is divided by a central perpendicular wall 24 extending in the longitudinal direction of the housing and includes switch gear and control means 26 arranged on each side of the central wall of the converter. The passage 18 is bounded on one side by a baffle wall 28 which extends vertically from the separating wall 4 to provide an air passage 30. At the opposite end of chamber 8 is a ceiling-mounted baffle wall 32 which provides an air passage 34 past the separating wall 4. The housing wall 36 opposite the wall 10 provides an air exit 38 above the lower end of the baffle wall 32. The housing 2 has removable side walls and/or doors so that the compartments containing the switchgear and control means 26 are accessible on both sides of the central wall 24. The housing walls are internally lined with sound-absorbent material, or are made from sound-absorbing material. The same applies to the baffle walls 28 and 32. Other air-baffles can, if necessary, be provided in chamber 8. The air deflection plate 20 is also soundproofed.

By placing the fan at the air-intake end of the converter, the noise of the fan is mainly directed in the same direction as the air passing through the converter, and so it is largely absorbed in the converter itself.

The arrangement of the switchgear and control means 26 on both sides of the central wall 24 contributes considerably to the soundproofing. Additionally, the airstream effectively cools the switchgear and control means 26 and thereby prolongs their service life or increases their reliability in operation. This in turn enables the expenditure on the quality of these components to be held within limits. This cooling is effective, although the airstream is affected by the heat emitted by the converter.

Figure 2:
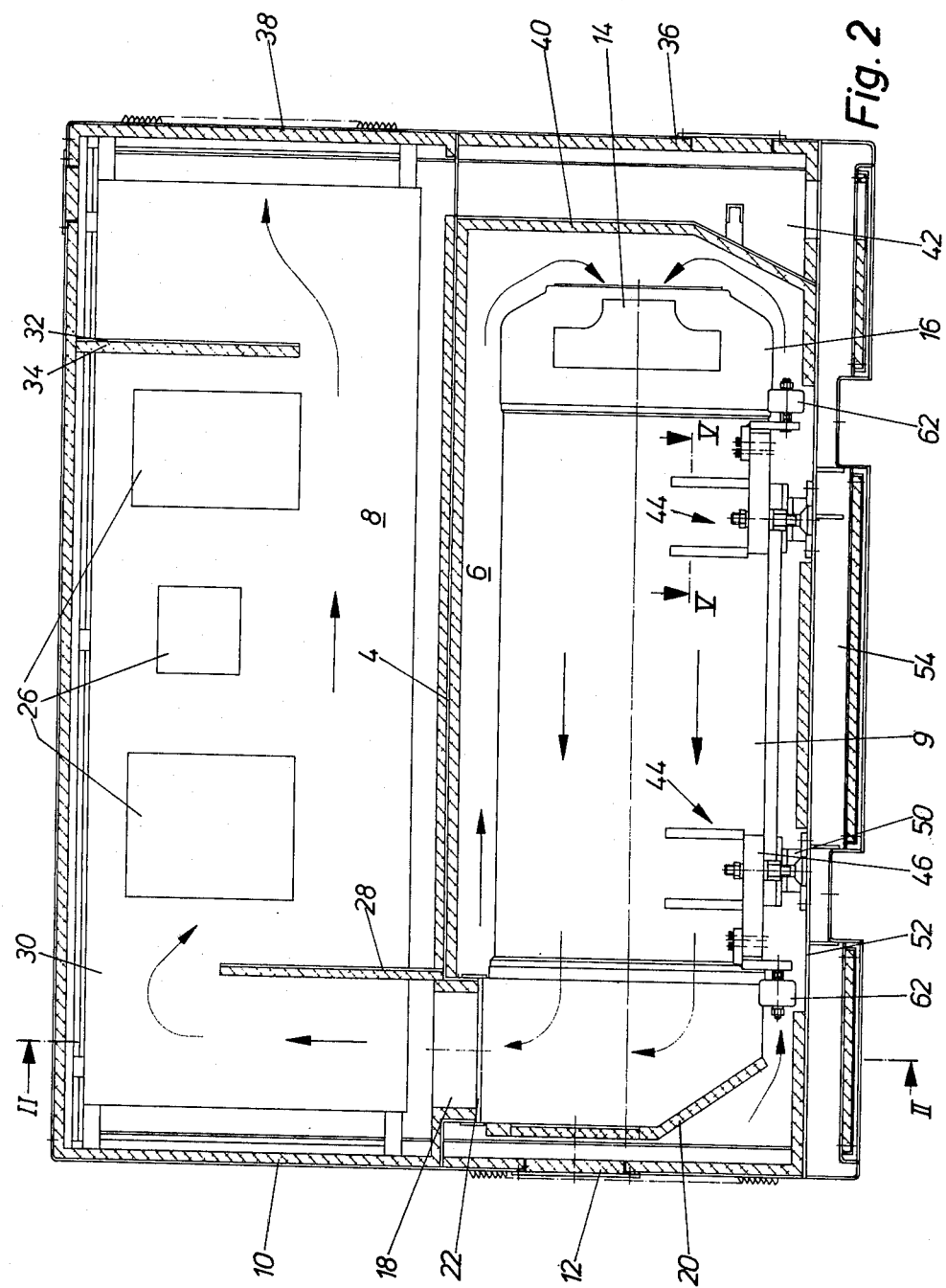
FIG. 2 is a section on the line I—I in FIG. 3 showing a preferred practical form of the frequency-changer.

The sectional view of a preferred practical form shown in FIG. 2 corresponds essentially to the schematic representation of FIG. 1. The same reference numerals are applied to like components in both drawings. The foregoing description applies to the layout and mode of operation as in FIG. 1. As distinct from FIG. 1, the cabling between the converter 9 and the switchgear and control means 26 in the upper chamber 8 is passed through a cable duct 42 in a sound-insulated wall 40 situated between the end wall 36 of the housing 2 and the adjacent end of the converter. The converter 9 is mounted at each end on a console 44, each comprising a flange plate 46 and two parallel supporting ribs 48. Secured to the under-sides of the flange plates 46 is a metallic vibration damper 50 by which the converter is supported on a stand 52 of a lower housing-frame 54. The metallic damper 59 is normally screwed to the housing frame 54 by a metal plate. As will be seen from FIGS. 2 and 6, the flange plate 46 may be lengthened towards the adjacent end of the converter. On this elongation 56 (see FIG. 6) is an angle-piece 58 to which a downward shank 60 is secured. This shank supports a revolving roller or wheel 62 having its axis of rotation 64 parallel to the rotor axis of the converter. The rollers 62 are so arranged that they lie at a distance above the stand 52 of the lower frame 54 to which the metallic dampers 50 are secured. The flange 46 also has a lifting device whereby the converter can be sufficiently raised above the stand 52 for the metallic dampers 50 to be clear of the stand. In the construction variants shown in FIGS. 2 and 6, the lifting device is shown best in FIG. 4 and is a threaded bolt 66 which has the pedestal 68 at its lower end. The upper end of bolt 66 is passed through a boring 70 in the flange 46. Below the flange is a nut 72 with a spherical upper surface by which it engages a corresponding spherical surface of a washer 74 lying against the lower side of the flange 46. On the upper side of the flange 46 a lock-nut 78 is screwed on the bolt 66. A circlip, split-pin or like retaining means may be provided above the lock-nut 78 as an end-stop for the lock-nut and so for the bolt 66.

Figure 3:
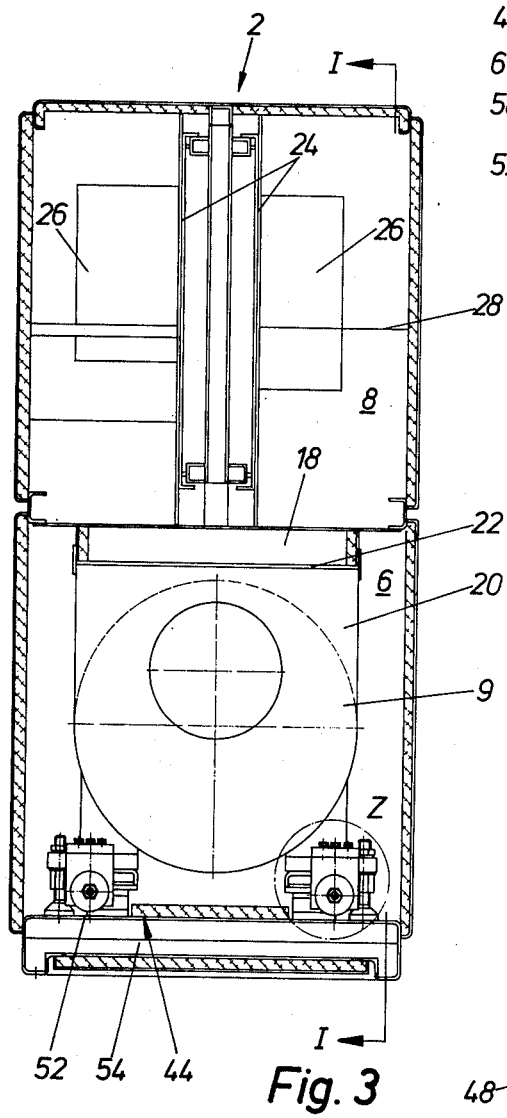
FIG. 3 is a section on the line II—II in FIG. 2.
Figure 4:
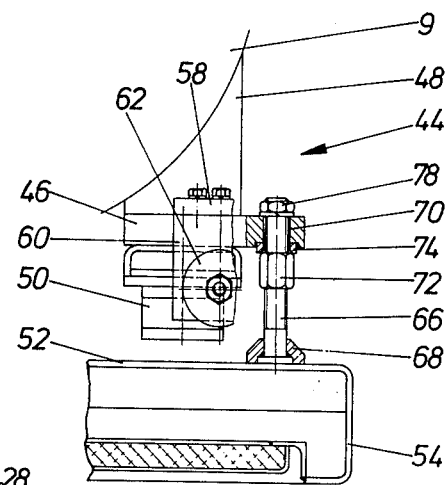
FIG. 4 is an enlarged view of a portion of the converter console (element Z in FIG. 3) showing the converter in a raised position.
Figure 5:
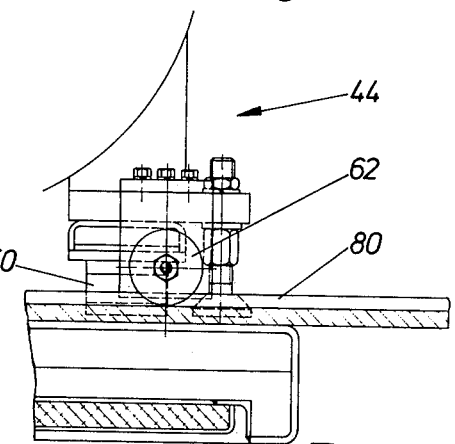
FIG. 5 shows the same unit as in FIG. 4 after lowering the converter on to rails.

In normal operation, the converter is supported by the lower frame of the housing via the metallic dampers 50 which rest on the stand 52, the nuts 72 being screwed so far down the respective bolts 66 that the bolts 66 are raised sufficiently for the pedestals 68 to lie clear of the stand 52. In this position (shown in FIG. 3) each bolt is held by the lock-nut 78. If the converter is to be removed from the housing, each lock-nut 78 is loosened and the pedestal 68 descends on to the stand 52. Then after loosening a connection between the main frame 54 and the metallic damper 50, the converter can be raised sufficiently by turning each nut 72 until the respective damper 50 is clear of the stand, as shown in FIG. 4. A rail 80 can then be introduced underneath each of the rollers 62 across the housing. The rails thus rest within the housing on the bearing surface of the main frame. An additional support (not shown) can be provided outside the housing. Using the nuts 72, the converter is then lowered sufficiently far for the rollers 62 to engage the rails 80 and, finally, for the pedestals to be positioned some distance above the stand 52. This is the position shown in FIG. 5. The converter can then be rolled sideways from the chamber 6 on the two rails. The length of these rails is such that the converter is freely accessible on all sides. Insofar as the maintenance work can be performed on the converter in this position, the electrical leads which are of sufficient length can remain connected to the converter.

In the reverse sequence the converter can be returned to the housing chamber 6 for final re-fastening of the metallic dampers to the main frame.

In order to gain access to the lower chamber 6, the longitudinal walls of that chamber are removable.

Figure 7:
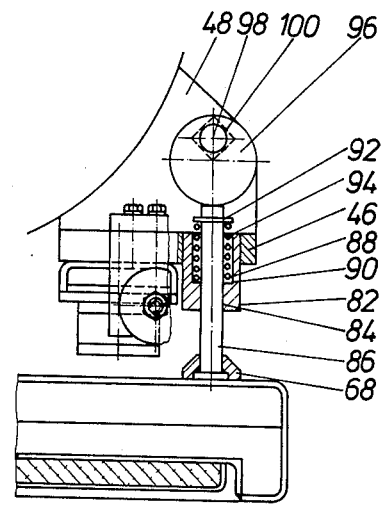
FIG. 7 shows another form of lifting device for the converter.
Figure 8:
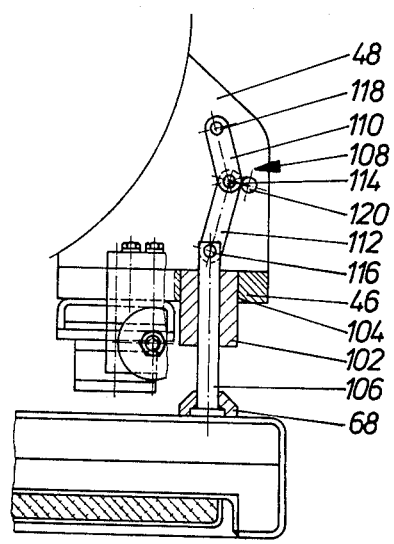
FIG. 8 shows a third form of the lifting device for the converter.

Since the converter has in general only to be taken out of the housing at relatively infrequent intervals for maintenance purposes, the simple lifting device with threaded bolts 66 just described is generally sufficient, but other quicker acting lifting devices can be provided, such as those illustrated in FIGS. 7 and 8.

Figure 6:
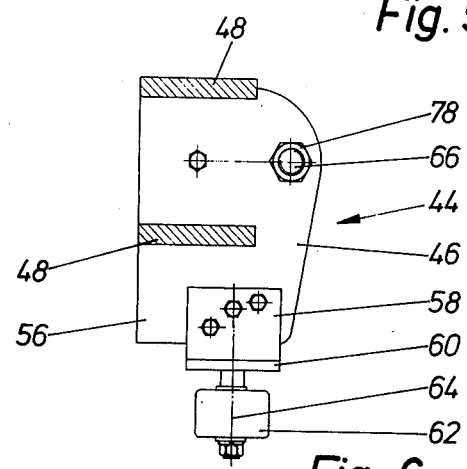
FIG. 6 is a section on the line V—V in FIG. 2.

In the design variant of FIG. 7, the flange 46 is fitted with a bush 82 which extends downwards from the flange. A smooth bolt 86 is in the bush vertically introduced at its lower end into the pedestal 68. In the upper part of the bush 82 there is a bore section 88 of greater diameter thereby forming a shoulder 90. At the top of the bush there is a stop ring 92. A compression spring 94 is set between the shoulder 90 and the stop ring 92. Pivotally mounted between the support ribs 48 of the console 44 there is a cam 96 which revolves freely on an axle 98 which has a key surface represented by a square portion 100. In this design variant the cam 96 is in the form of an eccentrically mounted circular disc. The bolt 86 presses on the circumference of the cam 96 under the tension of the spring 94, when the converter is in the raised position as illustrated in FIG. 6. The cam 96 is turned by a wrench to lower the converter. In this regard the cam 96 can be so formed that a pivotal motion of less than 180° is sufficient for a full lift. A rocking lever may be affixed to axle 98 instead of providing the square portion 100.

In the design illustrated in FIG. 8, the flange 46 again has an underneath, downward-extending bush 102 having a boring for a smooth perpendicular bolt 106 fitted with a pedestal 68. In this design, the actuating device is an elbow-lever drive or toggle-mechanism 108 having two arms 110 and 112 which are joined together at a common joint 114. The arm 112 is connected at its other end by a joint 116 to the upper end of the bolt 106 and the free end of the arm 110 is pivotable around an axle 118 extending between the two support ribs 48.

In FIG. 8, the lifting device is shown in the position in which the converter is fully raised from the stand 52. The two arms 110 and 112 are in a dead-center position held by a fixed buffer pin 120. In order to lower the converter, the elbow-lever drive is pivoted to the left, raising the bolt 106 on exceeding the dead-center position. For actuation, the pivot axle 118 may be fixed to the arm 110 and have a wrenching portion as in FIG. 7. As in the design illustrated by FIG. 7, in order to hold the pedestal 68 clear of the stand at rest, the bolt 106 may be provided with a surrounding compression spring. It is also possible for the axle 118 to have a torsional spring by which the elbow-lever drive is tensioned in the direction of its inactive position. Also in the design of FIG. 8 a pivotal motion of the operating arm through approximately 90° is sufficient for full lift to be achieved.

What I claim as my invention and desire to secure by Letters Patent of the United States is:

1. Apparatus for producing ventilation and soundproofing for a frequency-changer, comprising a housing having a first chamber and a second chamber separated from said first chamber by an insulated wall, a rotary frequency converter mounted in said first chamber and having a rotatable shaft on which a fan rotor is mounted for rotation therewith, said fan directing a flow of air through said converter in a first direction, an air passage formed in said insulated separating wall and providing communication between the converter and second chamber wherein air directed through said converter is forced through said air passage and into said second chamber for movememt therethrough in a second direction that is opposite to movement of the air through said converter in said first direction, means for controlling operation of said converter located in at least one of said compartments for exposure to the circulating air, and baffles located in said second chamber adjacent to the ends thereof and extending in a direction that is perpendicular to the longitudinal axis thereof, said baffles cooperating with the adjacent walls of said second chamber to define air passages therebetween through which the air is directed.

2. Apparatus as claimed in claim 1, a wall located in said second chamber and extending in a direction parallel to the longitudinal axis thereof and dividing said second chamber into two compartments.

3. Apparatus as claimed in claim 1 in which said second chamber includes a pair of end walls and a roof and an air exit formed in one of said end walls adjacent to a baffle, and the baffle adjacent to said one end wall extending downwardly from the roof of said housing chamber.

4. Apparatus as claimed in claim 3 in which said air exit is in an upper part of said one end wall in horizontal alignment with said downwardly-extending baffle.

5. Apparatus as claimed in claim 4 in which an air inlet is provided in said other end wall of the housing opposite said one end wall in which said air exit is located and communicating with said first chamber.

6. Apparatus as claimed in claim 5 in which said fan rotor is mounted at the end of said converter remote from said air inlet.

7. Apparatus as claimed in claim 1 in which said housing includes a supporting surface beneath said converter and in which said converter includes a plurality of supports, each support comprising a vibration damper normally arranged to rest on said supporting surface, a roller, having an axis of rotation parallel to the axis of rotation of said converter and positioned above said supporting surface when said vibration damper is engaged with said supporting surface, and a lifting device to raise and lower said vibration damper and said roller, said lifting device including a pedestal that is lowered to engage said supporting surface and then to lift said vibration damper from engagement with said supporting surface.

8. Apparatus as claimed in claim 7 including a pair of removable rails which are insertable one under each said roller when said vibration dampers have been lifted from engagement with said supporting surface, said pedestals then being raised from said supporting surface to permit said converter to be moved on said rollers along said rails.

9. Apparatus as claimed in claim 7 in which each said lifting device includes a vertically movable upright pin fitted at its lower end with said pedestal.

10. Apparatus as claimed in claim 9 in which each said pin is a screw-threaded bolt and each lifting device comprises a nut engaging the respective bolt and engageable with an underneath surface of the respective support.

11. Apparatus as claimed in claim 10 in which each said nut has a spherical end-face and in which there is a spherically recessed washer engaged by said spherical end face of said nut and engageable with the underneath surface of the respective support.

12. Apparatus as claimed in claim 9 in which each said lifting device also includes a spring acting to urge said pin in a direction to lift said pedestal thereon from said supporting surface, and a cam engaging the respective pin to move said pin axially against the force of said spring to move said pedestal into engagement with said supporting surface.

13. Apparatus as claimed in claim 9 in which each said lifting device also includes a toggle mechanism extendible through its dead-centre position to raise and lower said respective pin to disengage and engage the pedestal thereon with said supporting surface, said lifting device also including a stop that is engageable by said toggle mechanism after said toggle mechanism has been moved through the dead-center position in the direction to lower said pedestal to hold said pedestal in engagement with said supporting surface.

* * * * *